US010850670B1

(12) United States Patent
Lovins et al.

(10) Patent No.: US 10,850,670 B1
(45) Date of Patent: Dec. 1, 2020

(54) REMOVABLE ROLLER TRAY (71) Applicant: Lotis Technologies, Inc., Orion, MI (US)

(72) Inventors: Gary W. Lovins, Oxford, MI (US); Paul H. Dunstan, Clarkston, MI (US)

(73) Assignee: Lotis Technologies, Inc., Orion, MI (US)

( * ) Notice: Subject to any disclaimer, the term of this patent is extended or adjusted under 35 U.S.C. 154(b) by 0 days.

(21) Appl. No.: 15/645,581

(22) Filed: Jul. 10, 2017

Related U.S. Application Data (60) Provisional application No. 62/360,719, filed on Jul. 11, 2016.

(51) Int. Cl.
*B60P 1/52* (2006.01)
*B60R 5/04* (2006.01)
*B62D 33/02* (2006.01)

(52) U.S. Cl.
CPC .......... *B60R 5/041* (2013.01); *B62D 33/0207* (2013.01)

(58) Field of Classification Search
CPC ... B60R 5/04; B60R 13/01; B60R 2011/0084; B60R 5/041; B60P 7/0815; B60P 1/52; B60P 7/0892; B60P 1/003; B62D 33/08; B62D 33/0207
USPC ........................................................ 224/403
See application file for complete search history.

(56) References Cited

U.S. PATENT DOCUMENTS

| | | | | | |
|---|---|---|---|---|---|
| 5,597,193 | A | * | 1/1997 | Conner | B60P 7/0892 224/404 |
| 5,634,408 | A | * | 6/1997 | Jarkowski | B60P 1/003 108/44 |
| 5,823,595 | A | * | 10/1998 | Tronco | B60P 3/14 296/26.03 |
| 5,938,262 | A | * | 8/1999 | Mills | B62D 33/08 296/26.09 |
| 6,464,274 | B2 | * | 10/2002 | Mink | B60P 1/003 296/26.09 |
| 6,634,848 | B2 | * | 10/2003 | Henderson | B60P 1/435 14/71.1 |
| 6,702,532 | B1 | * | 3/2004 | Throener | B60P 7/0892 410/121 |
| 7,043,789 | B2 | * | 5/2006 | Morrish | A61G 3/061 14/69.5 |
| 7,125,082 | B2 | * | 10/2006 | Copus | B60P 1/24 298/1 A |
| 7,543,872 | B1 | * | 6/2009 | Burns | B60P 1/003 296/26.08 |

(Continued)

*Primary Examiner* — Nathan J Newhouse
*Assistant Examiner* — Matthew T Theis
(74) *Attorney, Agent, or Firm* — The Dobrusin Law Firm, PC (57) ABSTRACT

A removable roller tray for use in a pickup truck bed, wherein the tray comprises a base and a handle arranged on an edge of the base. The tray further comprises a plurality of notches arranged on a top surface of the base and a plurality of rollers arranged on a bottom surface of the base. The tray further comprises at least one lanyard connected to a side edge of the base on a first end thereof and a surface of the pickup truck on a second end thereof. The removable roller tray may allow for easy removal of items stored near the front of the pickup truck bed by allowing the removable roller tray to roll out to a predetermined position on the bed and extended tailgate.

20 Claims, 10 Drawing Sheets

(56) References Cited

U.S. PATENT DOCUMENTS

| | | | |
|---|---|---|---|
| 2009/0226276 A1* | 9/2009 | Lenz | B60P 7/0815 |
| | | | 410/129 |
| 2014/0308103 A1* | 10/2014 | Pike | B60P 1/64 |
| | | | 414/522 |
| 2016/0068091 A1* | 3/2016 | Ferkul | B60P 1/32 |
| | | | 298/12 |
| 2016/0107560 A1* | 4/2016 | Thygesen | B60P 1/52 |
| | | | 296/37.6 |

* cited by examiner

REMOVABLE ROLLER TRAY

BACKGROUND OF THE INVENTION

1. Field of the Invention

The present invention generally relates to roller trays and more particularly relates to a light weight removable roller tray for use in a pickup truck bed.

2. Description of Related Art

It is well known in the art to use heavy duty pickup liners and cases in the back of a pickup bed. Many of these prior art systems are permanently attached to the pickup truck bed with bolts and the like. Furthermore, many of these prior art cargo systems are heavy duty metal designs used for industrial purposes, such as for use by plumbers, welders, construction workers, etc. Many of these prior art cargo systems for use in pickup truck beds are bolted to either the side walls or truck bed with some sort of permanent securing mechanism. The prior art cargo systems generally are made of metal and are capable of storing heavy duty industrial tools, such as hammers, drills, saws, etc., and for use in industrial applications, such as plumbing, construction work and the other many trades. These systems generally are heavy duty and allow for the worker to store, reuse and remove tools and the like for numerous years. Many of these prior art systems include storage units specifically designed for a specific use within the pickup. The prior art storage systems may even include ramps to allow for placement of ATV's or other vehicles into the pickup bed, tool storage units along the sides of the front of the truck bed or storage containers arranged in various arrangements connected to the bottom of the pick up bed. Many of the prior art pickup storage systems have a pair of metal rails bolted to the pickup bed and then have arranged on those rails metal storage containers in the form of boxes or the like, which are capable of sliding along those rails to provide for some sort of access to the items therein.

One possible problem associated with the prior art pickup truck bed storage systems is that all of the prior art systems are permanently attached to the truck bed with bolts or some other heavy duty securing mechanism. Another potential problem with the prior art pickup bed storage systems is that they are very heavy, bulky and hard to install into the pickup truck bed. Furthermore, another potential problem with the prior art pickup bed storage systems is that they provide for less configurable systems and only use a predetermined permanent option for storage in the pickup truck. Still another potential problem with the prior art pickup truck storage systems is that the price of the systems tends to be high for a system that is not capable of being easily removed if the pickup truck buyer changes careers or decides on a different system.

Therefore, there is a need in the art for an improved light weight removable roller tray for use in a pickup truck bed. Also, there is a need in the art for a light weight removable roller tray that is capable of being removed, folded and stowed in a small area and has easily configurable pockets or areas arranged thereon for placement of various light weight products therewith. There also is a need in the art for a light weight removable roller tray system for a pickup truck that is low cost, easy to manufacture, easy to install and remove from a pickup truck bed. Furthermore, there is a need in the art for a lightweight removable roller tray that attaches and detaches to the sidewall of a pickup bed via lanyards, for quick removal and installation of the removable roller tray.

SUMMARY OF THE INVENTION

One object of the present invention may be to provide a novel and unique removable roller tray.

Another object of the present invention may be to provide a removable roller tray for use in a pickup truck bed in order to allow access to the entire length of the truck bed.

Still another object of the present invention may be to provide a removable roller tray that is capable of being attached to a pickup truck bed via lanyards attached to the side walls of the pickup truck bed.

Still another object of the present invention may be to provide a removable roller tray that is light weight and is designed for light cargo loads.

Still another object of the present invention may be to provide a removable roller tray that is capable of being folded and stowed in a small area when not in use in the pickup truck Still another object of the present invention may be to provide a roller tray that includes a plurality of dividers that allow for configurable pockets or storage areas to be placed on a surface of the roller tray.

Still another object of the present invention may be to provide a roller tray that is low in price, easy to manufacture, and easy to install and uninstall by any user of a pickup truck.

Still another object of the present invention may be to provide a roller tray that is designed for urban truck users that allow them to have storage and ease of access for their entire truck bed.

Still another object of the present invention may be to provide a roller tray for pickup truck users that may allow items to be placed on the roller tray and not move around in the truck bed during driving of the pickup truck, According to the present invention, the foregoing and other objects and advantages are obtained by a novel design for a removable roller tray for use in a pickup truck bed. The roller tray of the present invention is light weight and allows users to access the entire length of the truck bed without having to remove a cover for the pickup truck bed, such as a tonneau cover, or climb into the bed under a cap to retrieve items located near the front of the pickup truck bed. The removable roller tray of the present invention may allow the user of the pickup truck to open the tailgate, and slide the truck roller tray or trolley out until a lanyard, which is attached to at least one side of the roller tray, is fully extended and taut in order to allow access to items that may have been placed up against the truck cab near the front of the pickup truck bed. The roller tray generally has a rectangular shape and is made of a light weight plastic material. The roller tray may be hinged along a centerline thereof allowing for easy storage and folding of the system when not in use in the pickup truck bed. The roller tray also may have a plurality of pockets and channels formed at various positions therein to allow for the easy removal and insertion of dividers capable of creating configurable pockets or storage areas for the roller tray according to the present invention. The light weight roller tray system is capable of being installed and removed by one person into the bed of the pickup truck system. The roller tray may also include at least one lanyard connected to a side surface of the roller tray on one end thereof and connected to at least one side wall of the pickup truck bed on the other end thereof. This lanyard may allow for the roller tray system to roll from a fully inserted to a fully extended or partially removed position in order to allow for the user of the pickup truck to access items stored near the front wall of the pickup truck bed. The roller tray may also include a plurality of rollers arranged on a bottom surface thereof which allows for easy sliding and rolling of the removable roller tray between a fully inserted position and a fully extended position.

One advantage of the present invention may be that it provides a novel and unique roller tray.

Another advantage of the present invention may be that it provides for a roller tray for use in a pickup truck that allows the user access to the entire length of the pickup truck bed.

Still another advantage of the present invention may be to provide a roller tray that allows the user to have fill access to the entire length of the truck bed without having to remove a tonneau cover or climb into the pickup truck bed under a pickup cap or the like.

Still another advantage of the present invention may be to provide a roller tray for use in a pickup truck that allows the user to open the tailgate and slide the roller tray out until the lanyard is fully extended and taut to access items that may have been placed up against the truck cab wall of the pickup truck bed.

Yet another advantage of the present invention may be to provide a roller tray for use in a pickup truck that is designed for urban truck users to have storage and ease of access to their entire truck bed.

Still another advantage of the present invention may be that it provides for a roller tray that is capable of being used with dividers that may allow items to be placed on the roller tray in predetermined positions and not move around in the pickup truck bed.

Still another advantage of the present invention may be to provide a roller tray that is light weight, removable and easy to be installed and removed from the pickup truck bed by a single person.

Still another advantage of the present invention may be that it provides for a roller tray that is attached via at least one lanyard to the pickup truck bed to allow for the pickup truck roller tray to slide between a fully inserted position and a fully extended position to allow for easy access of all items in the pickup truck bed.

Still another advantage of the present invention may be that it provides a roller tray for use in a pickup truck that may be removed, folded and stowed into a small area when not being used within the pickup truck bed.

Still another advantage of the present invention may be that it provides for a roller tray for use in a pickup truck that has configurable pockets therein for placement of various products thereon.

Yet another advantage of the present invention may be that it provides for an easy to manufacture and install low price roller tray for use in a pickup truck for everyday urban truck users.

Still another advantage of the present invention may be that it provides a roller tray that has a hinge along a center line thereof to allow for easy storage of the unit when not in use in the pickup truck bed.

Still another advantage of the present invention may be to provide a roller tray that has a plurality of rollers located on a bottom side thereof which allows for easy insertion and removal of the roller tray in the pickup bed.

Still another advantage of the present invention may be that it provides for a roller tray that has at least one lanyard attached to one side edge of the roller tray on one end thereof and the other end of the lanyard connected to a hook or other connector system located on a wall of the pickup truck bed.

Other objects, features and advantages of the present invention may become apparent from the subsequent description, and appended claims, taken in conjunction with the accompanying drawings.

DESCRIPTION OF THE EMBODIMENT(S)

Figure 1:
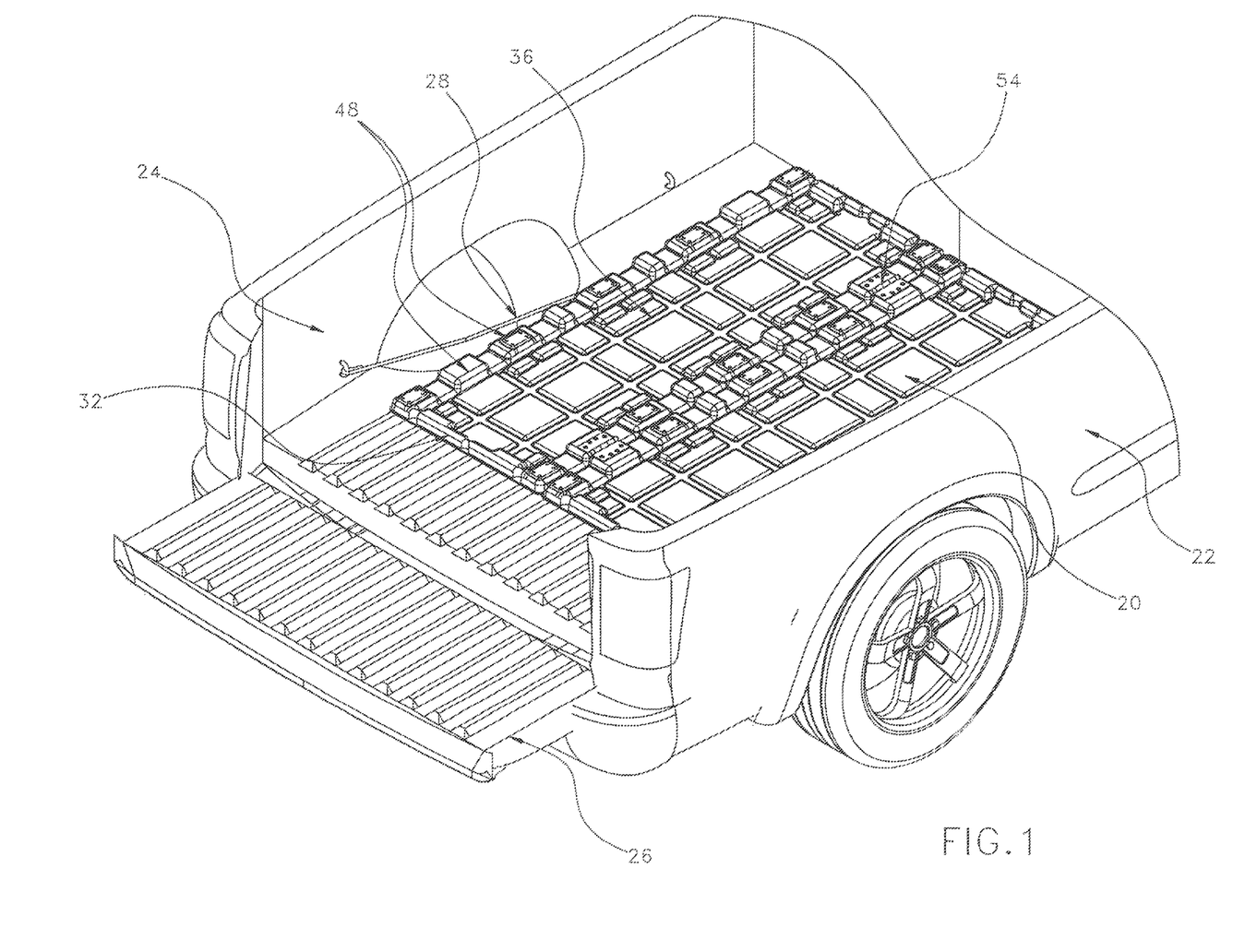
FIG. 1 shows a perspective view of a roller tray for use in a pickup truck according to the present invention.
Figure 2:
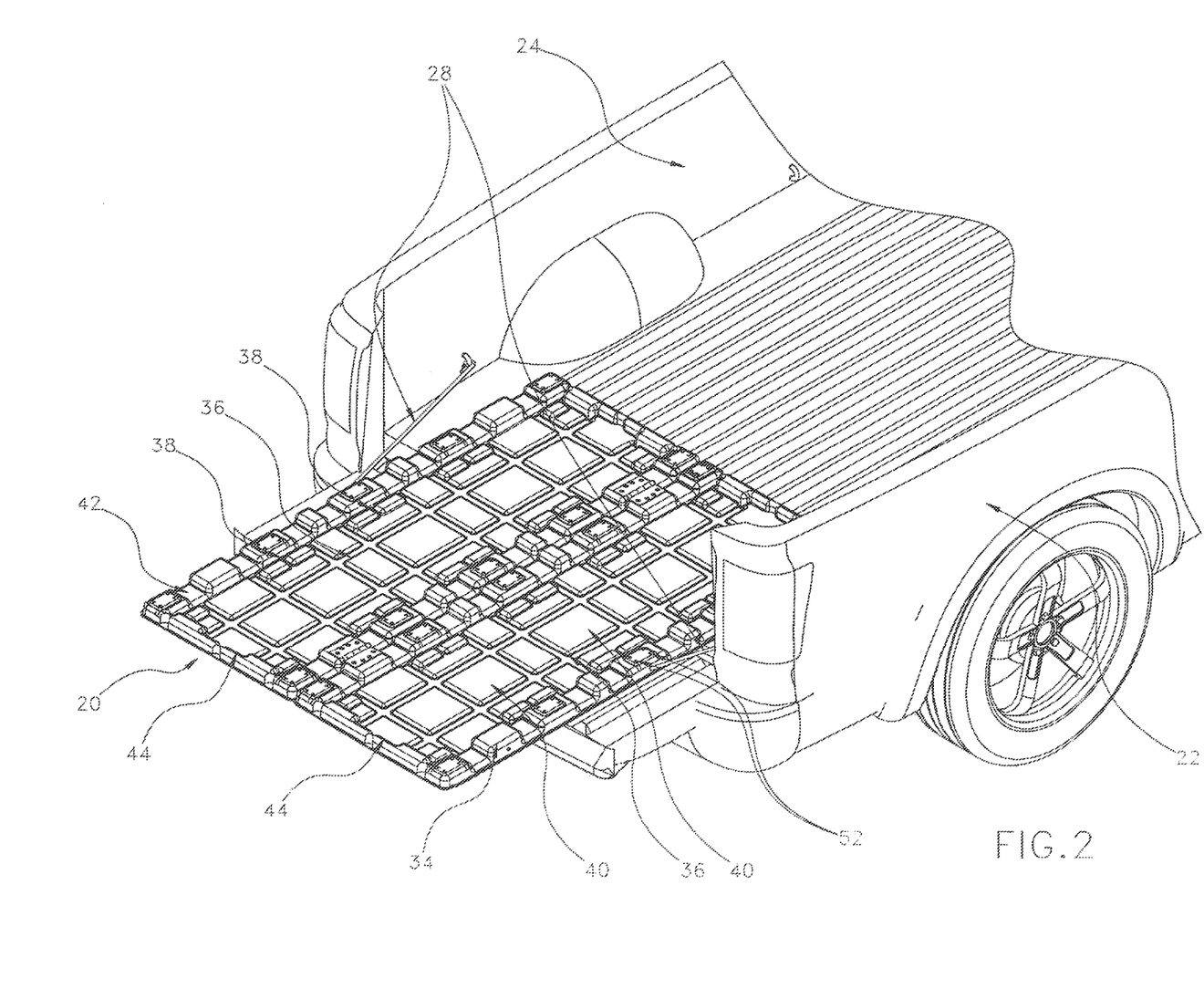
FIG. 2 shows a perspective view of a roller tray fully extended from a pickup truck bed according to the present invention.
Figure 3:
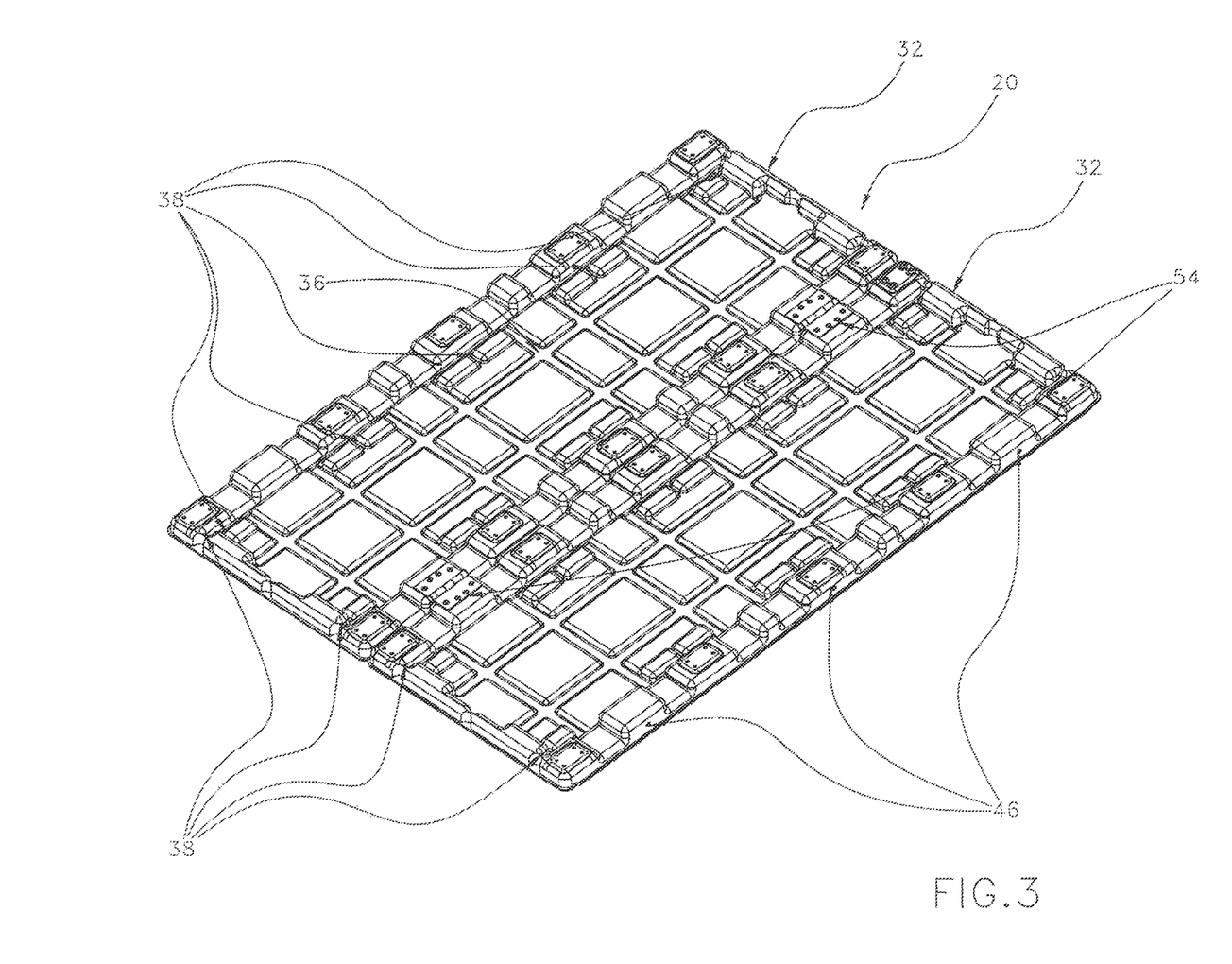
FIG. 3 shows a top view of a roller tray according to the present invention.
Figure 4:
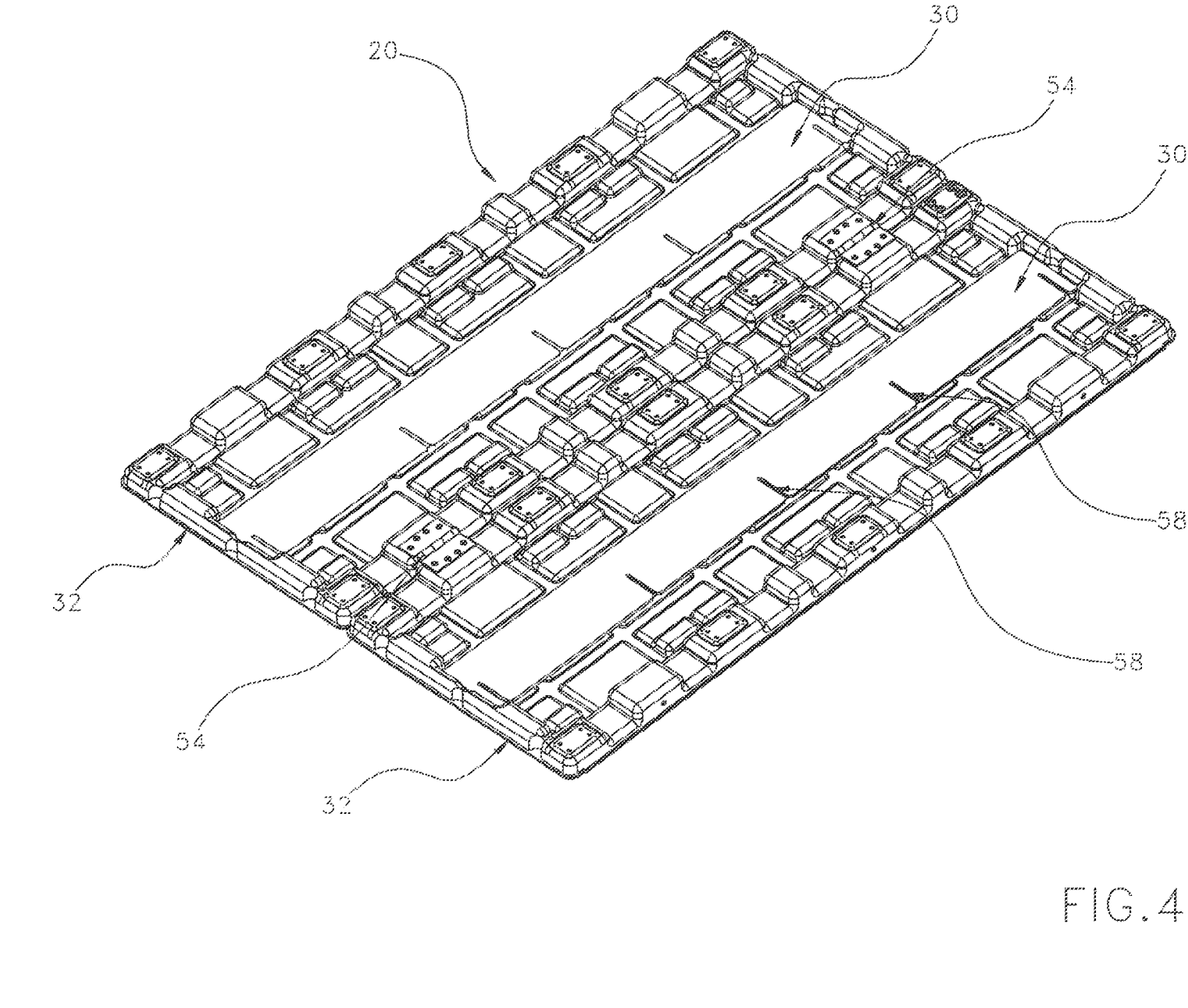
FIG. 4 shows a top view of a roller tray according to the present invention.
Figure 5:
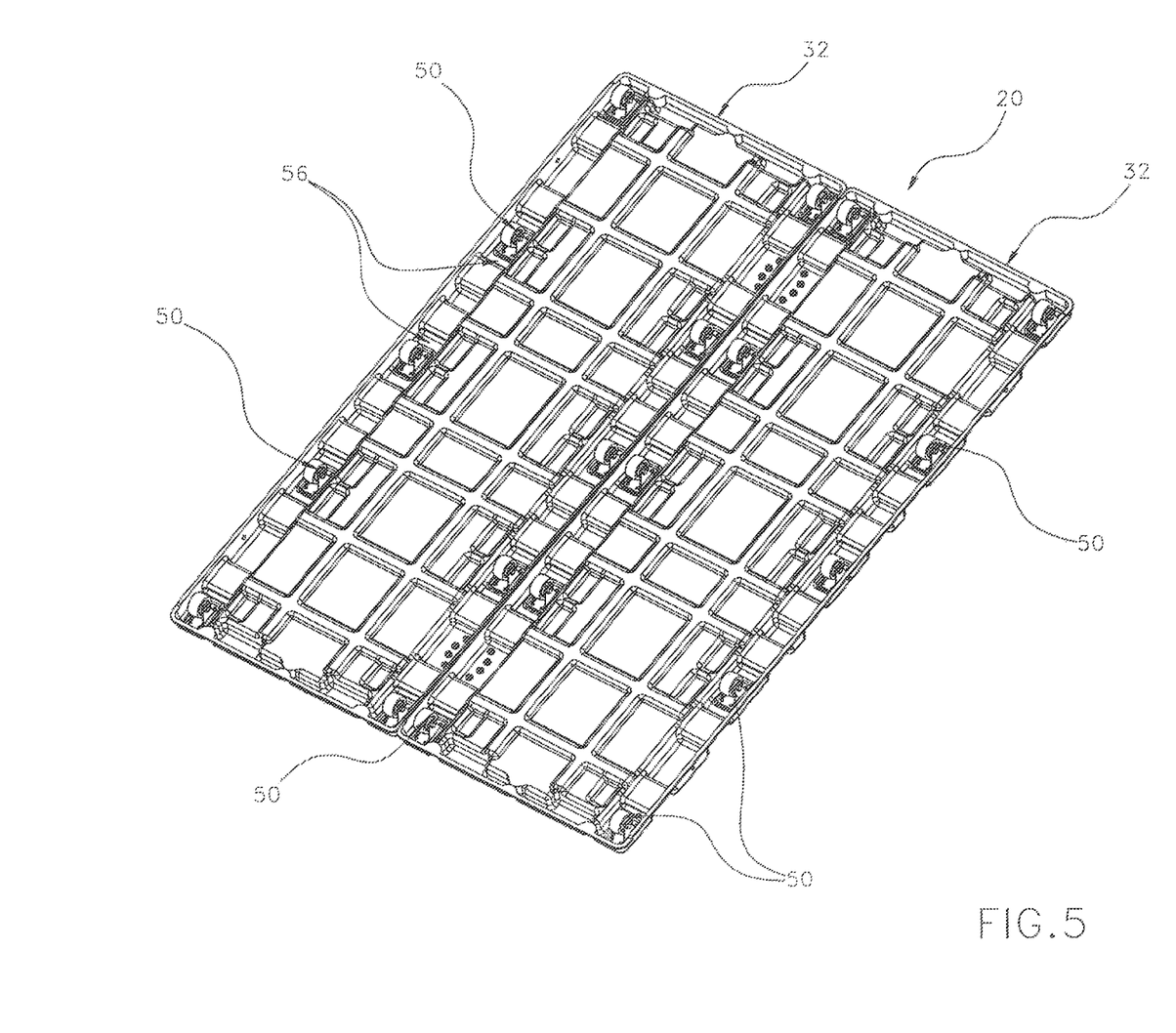
FIG. 5 shows a bottom view of a roller tray according to the present invention.
Figure 6:
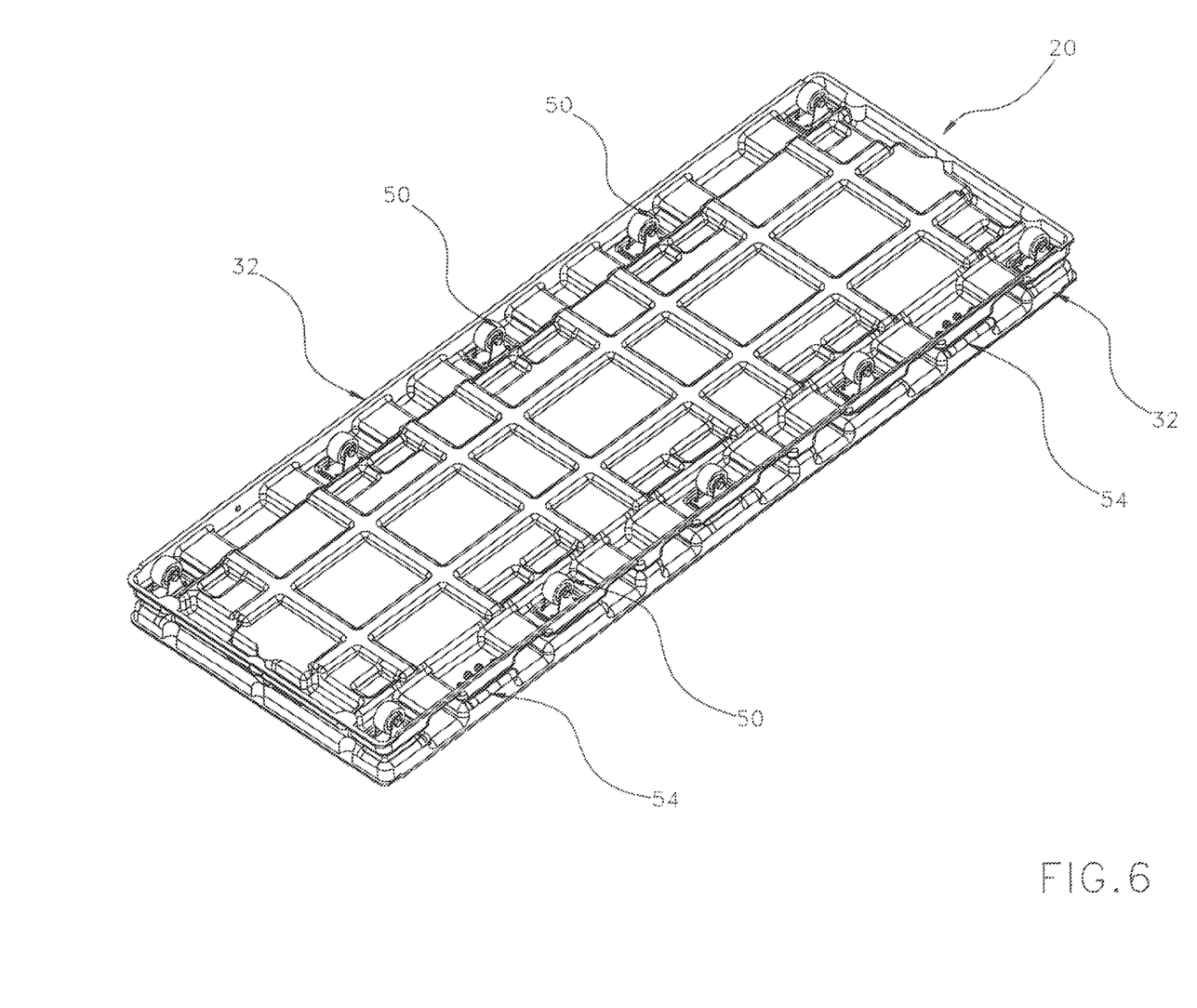
FIG. 6 shows a view of the roller tray in a folded position according to the present invention.
Figure 7:
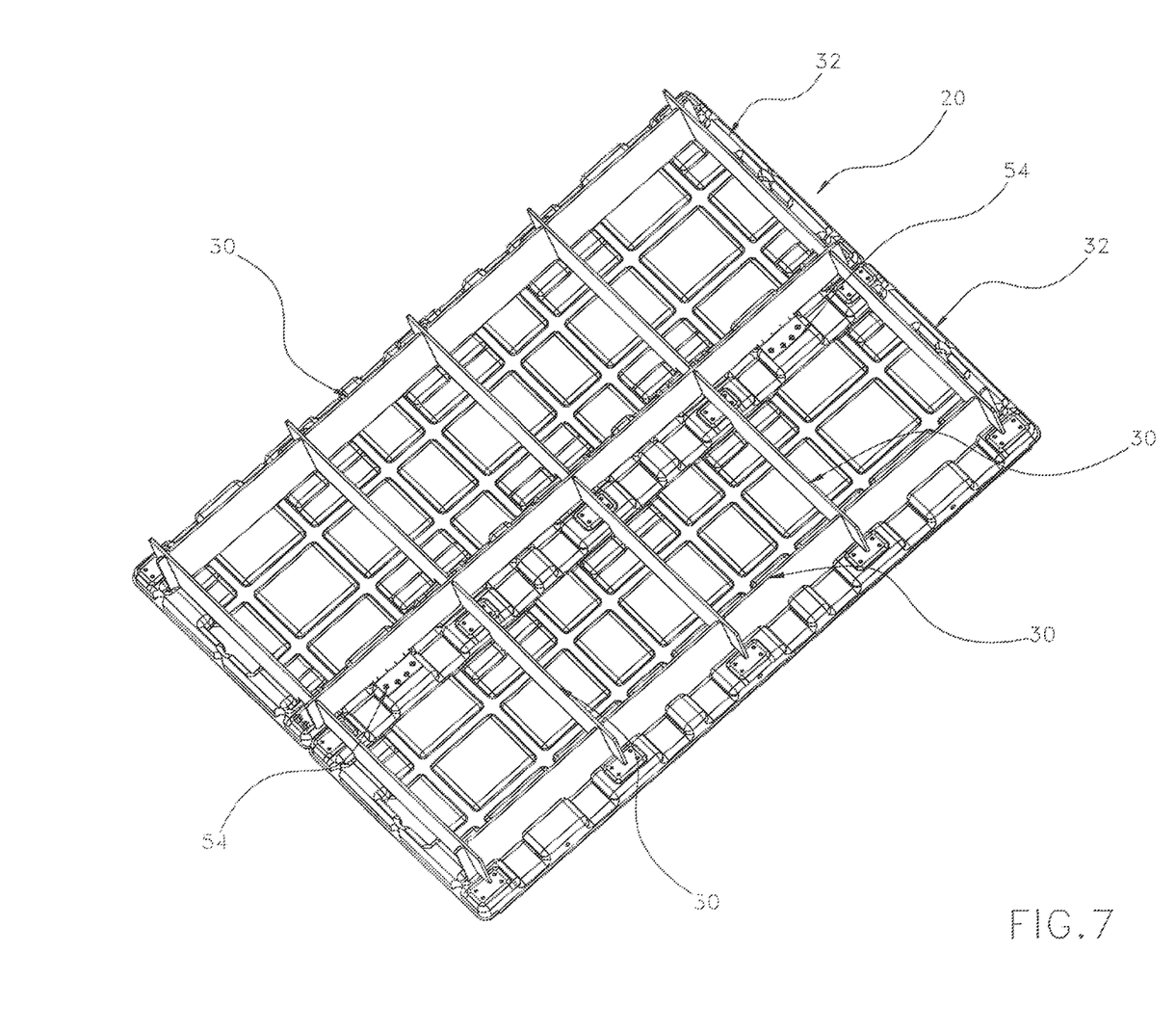
FIG. 7 shows a roller tray having a plurality of dividers arranged thereon according to the present invention.
Figure 8:
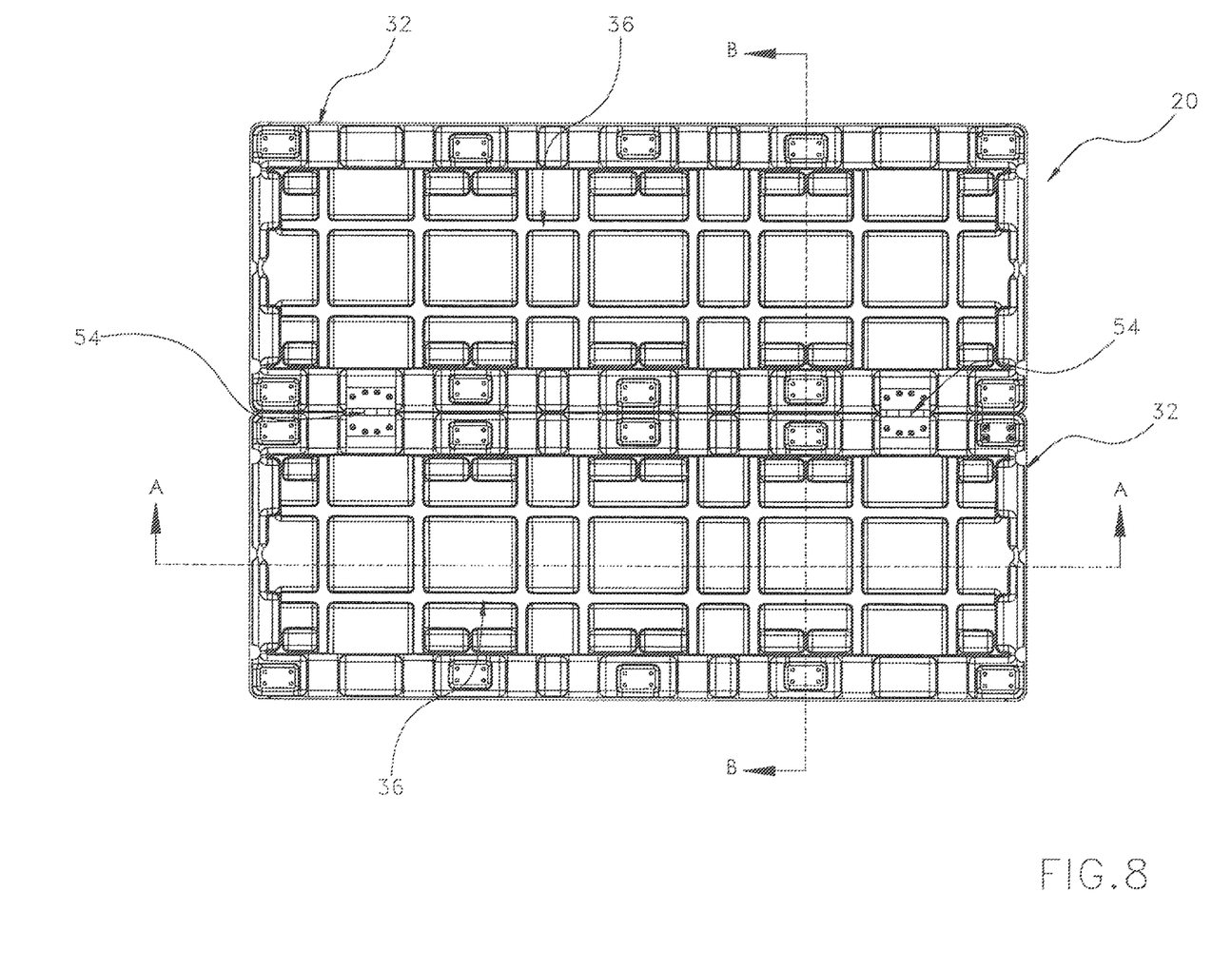
FIG. 8 shows a top view of a roller tray according to the present invention.
Figure 9:
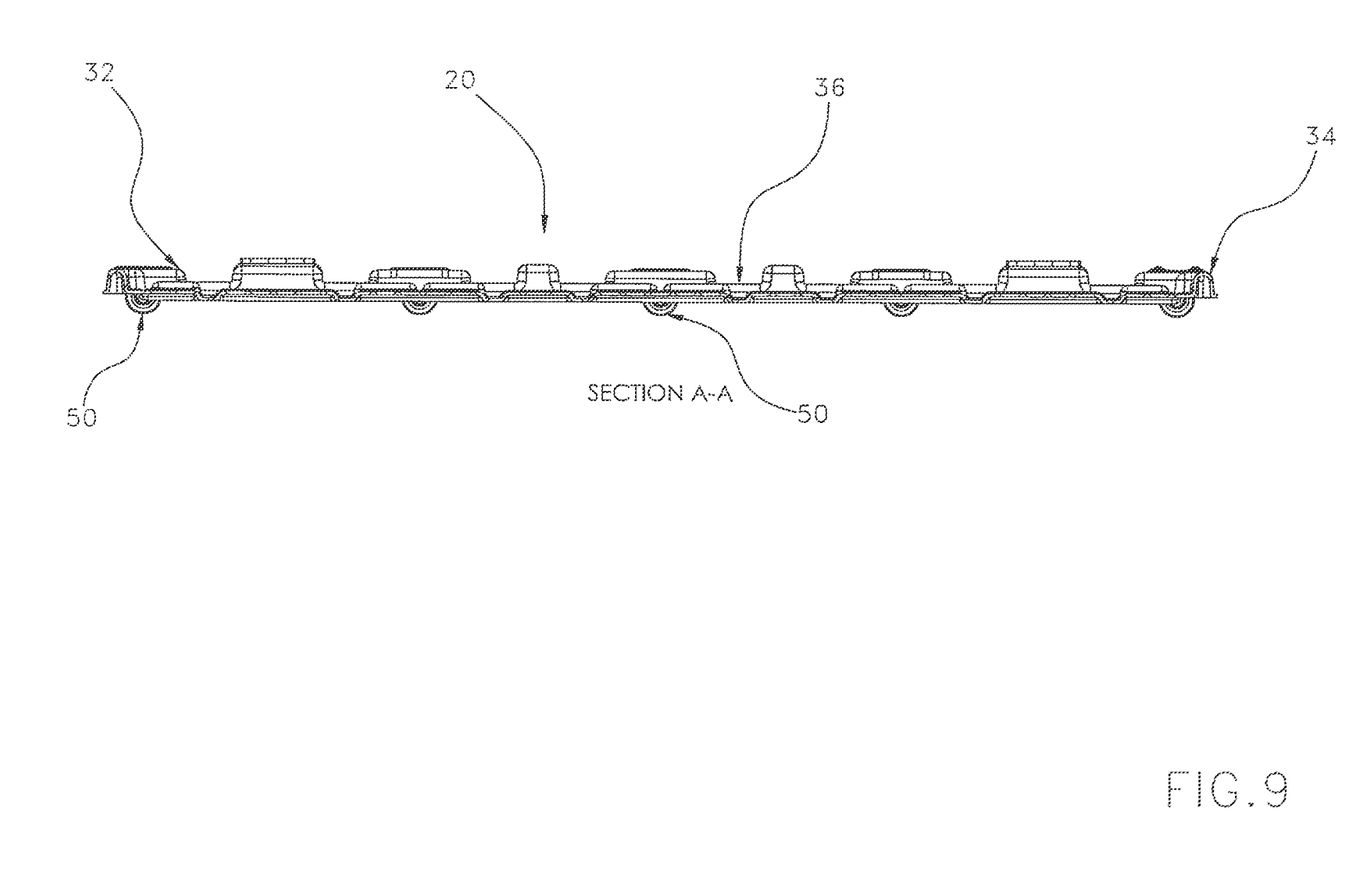
FIG. 9 shows a cross sectional view of the roller tray taken along line A-A of FIG. 8.
Figure 10:
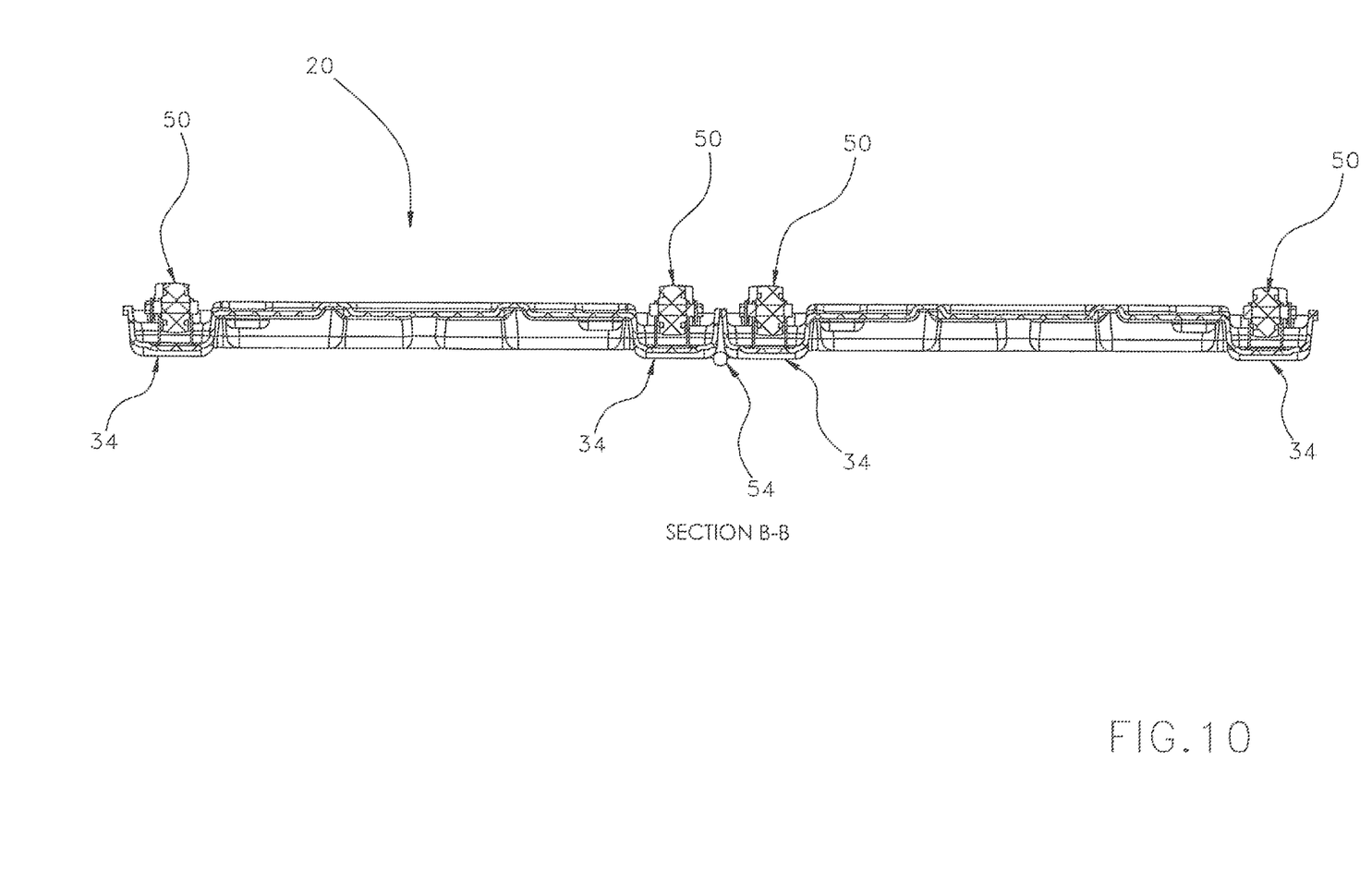
FIG. 10 shows a cross sectional view of the roller tray according to the present invention taken along line B-B of FIG. 8.

Referring to the drawings, a light weight removable roller tray 20 that is capable of being used in a pickup truck 22 is shown according to the present invention. It should be noted that the roller tray 20 is capable of being used in any type of pickup truck 22 and in any other type of truck or vehicle such as but not limited to a heavy duty van, flat bed, or even a passenger car that has a big storage area for items for use by the vehicle users. The roller tray 20 of the present invention generally may allow the user of the pickup truck 22 access to the entire length of the truck bed 24 without having to remove any type of cover from the truck bed 24. Many prior art users may place a tonneau cover or truck cap over the back of the pickup truck bed 24 and have to climb under or remove the cover or the cap in order to access items placed within the pickup truck bed 24. The user of a pickup truck 22 with the roller tray 20 according to the present invention may only have to open the tailgate 26 and slide the roller tray 20 out to its fully extended position, i.e., until a lanyard 28 is fully extended and taut to access items that may have been placed up against the front wall or the truck cab wall within the pickup truck bed 24. The roller tray 20 generally is designed for urban or non-commercial truck users hence allowing for them to have storage within and ease of access to their entire truck bed 24. It should be noted that the roller tray 20 also may include a plurality of dividers 30 arranged thereon which may allow for items to be placed on the roller tray 20 and not move around in the truck bed 24 during driving of the pickup truck 22. It should further be noted that the roller tray 20 of the present invention is designed as a light weight tray for use by urban consumers of pickup trucks. It is also contemplated to create a robust sturdier version of the roller tray 20 for use by industrial and professional pickup truck users.

The roller tray 20 of the present invention generally includes a two piece base 32, which generally is arranged on the pickup truck bed 24. The base 32 generally has a rectangular shape when viewed from above. However, it should be noted that any other shape may be used for the base 32 of the roller tray 20 according to the present invention. The base 32 may have any known length and width depending on the size of the pickup truck bed 24 in which it may be used. Generally, the base 32 may be wide enough to be inserted completely, in a flat position, in the pickup truck bed 24, such that it fits within any walls of the pickup truck bed 24 or other structures extending into the pickup truck bed 24, such as a wheel well, etc. Furthermore, the length of the long portion of the rectangular shaped base 32 generally may allow for the pickup truck tailgate 26 to be closed when the roller tray 20 is fully inserted within the pickup truck bed 24. It should be noted that any other sized roller tray 20 may be used such as a half sized one that only covers half of the pickup truck bed, etc. The rectangular base 32 generally may have a predetermined thickness and a predetermined height from which it extends from the bottom of the pickup truck bed 24. The base 32 generally may have a lip 34 extending around the entire outer periphery of the base 32. The lip 34 may generally extend a predetermined distance in an upward direction from a bottom surface of the base 32. The lip 34 may allow for items placed directly on the top surface of the base 32 to be held in place without rolling around the bed during usage. The lip 34 may have a predetermined width which is generally smaller along the two shorter edges of the base 32 and wider along the long edges of the base 32. It should be noted that the base 32 is generally molded with any type of moldable plastic. In one contemplated embodiment a high density polyester (HDPE) plastic may be used. However, it should be noted that any other type of plastic, ceramic, metal, composite or natural material may also be used to form the base 32 of the roller tray 20 according to the present invention. During the molding operation the base 32 may have a plurality of channels 36 molded into a top surface of the base 32. These channels 36 may be used to help hold items and the like. The channels 36 generally run parallel to the longitudinal edge and short edge of the base 32. These channels 36 intersect with each other to form a checker board type pattern of channels 36 on a top surface of the roller tray 20, thus creating a pattern of raised areas 40 along the top surface of the base 32. The raised areas 40 may have any known shape, such as but not limited to square, rectangular, triangular, circular, etc. A plurality of channels 42 are also arranged on the outer edge lip 34 of the base 32. It should be noted that any number lip of channels may be arranged in the outer edge lip 34 of the base 32 and on the main body surface of the base 32 as shown in the drawings. The base 32 may also include a plurality of notches 38 arranged at predetermined positions along the top surface of the base 32 generally abutting or near the lip 34, which allows for dividers or divider walls 30 to be arranged therein. In one contemplated embodiment, a plurality of notches 38 are arranged along the longitudinal or long edge of the base 32 in equally spaced apart intervals. In one contemplated embodiment a total of five notches 38 may be arranged thereon. On the short edge of the base 32, in one contemplated embodiment, two notches 38 are arranged generally near each end thereof. However, it should be noted that any other number of notches 38 may be arranged on the base 32 to allow for a plurality of designs and arrangements for the dividers 30 arranged on a top surface of the roller tray 20. The notches 38 may generally allow for a press fit to occur between a surface of the divider 30 and the base 32. Therefore, the notches 38 may have any known shape. The shape shown generally has circular end members 32 adjacent to one another with a predetermined gap arranged therebetween wherein the divider 30 is arranged within the gap between the two half circle ends of the notch 38 and is used to secure the divider 36 therein. As noted above, any number of notches 38 may be arranged along the long edge or the short edge of the base 32 depending on the configuration and requirements of the roller tray 20 within the pickup truck bed 24.

Furthermore, arranged on a short side or edge of the base 32 may be a handle 44 molded therein. The handle 44 may be used to easily grasp and roll or pull the roller tray 20 from its stored fully inserted position to its fully extended position from the pickup truck bed 24. The handle 44 is molded therein, such that it creates an ergonometric fit for the users hand during use thereof. In the embodiment shown the handle 44 is generally arranged at a mid point of the short edge of the base 32. However, it should be noted that the handle 44 may be molded anywhere into the short edge of the base 32 and may even be attached to the base 32 after the molding operating thereon, thus having a handle 44 added after the base 32 is molded, via any known fastener in the side wall of the lip 34 thereof. The base 32 may also include a plurality of attachment orifices 46 arranged through a side surface or side wall which forms the lip 34 on the long edge of the base 32. The attachment orifices 46 may be of any known shape, in the embodiment shown in the drawings, they are circular orifices, however any other shaped orifice, such as a square, triangular, oval or any other shaped orifice may be used. Any number of attachment orifices 46 may be used along the long edge or the short edge of the base 32 of the roller tray 20. In one contemplated embodiment, three orifices 46 are arranged at equal distant positions along the long edge of the base 32 on each side of the base 32. The attachment orifices 46 generally are used as attachment positions for a lanyard 28 to be connected thereto. It should be noted that the lanyard 28 may be connected via any known securing technique, such as any type of fastener, such as a bolt, rivet, eye bolt, etc., or any other type of mechanical or chemical fastening technique. It should further be noted that the attachment orifices 46 arranged in the side wall of the base 32 may be molded therein or machined therein via any known machining technique after molding of the base 32. The base 32 may also include a plurality of raised surfaces 48 along the lip 34 thereof, wherein the raised surfaces 48 are defined by the channels 42 arranged along the outer periphery lip 34 of the base 32. The raised surfaces 48 may include a plurality of orifices 52 through a surface thereof. The orifices 52 generally may be arranged in any known pattern. In the embodiment shown, four orifices 52 are arranged in a generally rectangular pattern. These orifices 52 through the raised surfaces 48 of the lip 34 of the base 32 may be used to attach a plurality of rollers 50 to a bottom side of the base 32. It should further be noted that at least two of the raised surfaces 48 may have a plurality of holes or orifices 52 arranged in a different manner than those described above and it should be noted that the plurality of orifices 52 through these raised surfaces 48 may be arranged in different patterns and may either be molded directly into the base 32 or machined into the base 32 after molding thereof.

As described above the base 32 for the roller tray 20 according to the present invention is a two piece base. In one embodiment, a first and second base 32 may be attached to one another via a hinge 54 to create a full roller tray 20 according to the present invention. Hence, a first base 32 is molded and a second base 32 is molded according to the specifications described above and then the first and second base 32 are connected to one another via hinges 54 along one longitudinal edge of each of the first and second bases 32. The combined first and second bases 32 create a full removable roller tray 20 according to the present invention. It should be noted that the roller tray 20 as shown is two bases 32, however it is also contemplated to use only one base 32 or more than two bases 32 to create the roller tray 20. It should be noted that the hinge 54 generally is arranged on a top surface of the base 32 and has any known fasteners arranged therethrough to allow for a secure connection of the first base 32 to the second base 32. In one contemplated embodiment, the second raised surface 48 from each longitudinal end on one side of the first and second base 32 are used to connect one plate of the hinge 54 to the first base 32 and the second plate of the hinge 54 to the second base 32. This may allow the first base 32 and second base 32 to be pivotable with regard to one another thus allowing for the roller tray 20 to be folded in half and stored when not in use in the pickup in a more efficient manner by using less storage area. It should be noted that in one contemplated embodiment the hinge 54 is a metal hinge, however it is also contemplated to use any other type of material, such as any type of hard plastic, composite, natural material or any other metal other than steel for the hinges 54 to be used in the present invention. The hinge 54 may also include a plurality of orifices therethrough which align with and mate with the orifices 52 in the base 32. It should be noted that any type of fastener may be used, such as a screw, or bolt and nut arrangement to secure the hinge 54 to the top surface of the first and second base 32. Therefore, with the use of the hinges 54 to connect the first and second bases 32 to one another, it may allow for easy storage and removal of the roller tray 20 from the pickup truck bed 24. It should further be noted that it is also contemplated to mold the roller tray 20 as one unit and not have a hinge 54 arranged thereon. Furthermore, it is also contemplated to have a hinge 54 molded directly into the base 32, which may allow for the roller tray 20 to fold in half with a plastic hinge which is molded directly into the base 32 of the roller tray 20. It should further be noted that it is also contemplated to use more than the two hinges 54 as described and shown in the drawings, however it is contemplated to use only one hinge 54 or more than two hinges 54 to allow for a more robust connection between the first and second base 32 according to the present invention. It is also contemplated to use the hinges 54 at other areas other than the raised surfaces 48 arranged along the lip 34 of the long edge of the base 32.

The roller tray 20 also may include a plurality of rollers 50 arranged on a bottom surface thereof. In one contemplated embodiment, the rollers 50 are casters and they are staggered in order to keep an entire row from falling into grooves located in the truck bed. In one contemplated embodiment, a total of twenty casters 50 are used on the roller tray 20 in order to disperse the load of any item stored on the top surface of the roller tray 20. It should be noted that any type of wheel or roller 50 may be used for the roller tray 20 according to the present invention, but in the embodiment shown, fixed line casters are used, however rotating casters, or any other type of wheel or caster may be used to allow for easy rolling and insertion and removal of the roller tray 20 within the pickup bed 24. In the embodiment shown, the casters 50 generally have plastic wheels attached via a metal axle to a metal fork, wherein the metal fork is connected to a flat base member. It should be noted that in one contemplated embodiment the casters 50 are arranged within a pocket 56 within the bottom surface along the longitudinal or long edge of the base 32 according to the present invention. The pockets 56 are on the opposite side of the raised surfaces 48 arranged along the outer lip 34 on the long edge of the base 32. In one contemplated embodiment a total of four fasteners may be used to align with the orifices premolded or machined into the raised surfaces 48 of the base 32. Thus, any known fastener, such as a screw, a nut and bolt, a rivet or any other type of fastener may be used to connect the casters 50 to the bottom surface of the base 32 of the roller tray 20. In one embodiment shown, a total of twenty casters 50 are arranged at predetermined intervals along the longitudinal or long edge of the first and second bases 32. This may allow for even weight distribution and load distribution of the roller tray 20 and easy efforts in rolling the tray between its fully inserted and fully extended position. Furthermore, it should also be noted that any other type of material may be used for the wheel 50, the fork and the base of the caster 50, such as any known plastic, ceramic, composite, natural material or metal may be used for any of the parts for any of the components of the roller tray 20 according to the present invention.

The roller tray 20 also may include at least one lanyard 28 connected to one of the attachment orifices 46 arranged on a longitudinal edge of the base 32. In one contemplated embodiment a first and second lanyard 28 may be attached to the base 32 according to the present invention. The first lanyard 28 may be attached to one longitudinal edge of the base 32 while a second lanyard 28 may be attached to another longitudinal edge of a base 32 according to the present invention. The lanyard 28 may be attached to any of the orifices 46 arranged on the outer edge of the base 32 via any known fastener, such as a screw, a nut and bolt, a rivet or any other known mechanical fastening or chemical fastening technique. The user may choose which of the attachment orifices 46 to connect the lanyard 28 to depending on how far the users wants the roller tray 20 to roll within the bed in its fully inserted position and how far they want it to roll out of the bed in its fully extended position. It should be noted that the lanyard 28 generally may have any known length and width and generally is made of a fabric like material. On each end may be a clip or connector mechanism which allows for easy connection to the edge of the base 32 or to a d-ring or other surface arranged along a side wall, front wall or tailgate of the pickup truck bed 24. Therefore, one end of the lanyard 28 may also include a clip mechanism which allows for it to be easily clipped, such as a carbineer or d-clip connector to a d-ring arranged along a side wall of the pickup truck bed 24. This may allow for easy removal and connection of one end of the lanyard 28 to the pickup truck bed 24 via the d-clip or carbineer arranged on one end of the lanyard 28. It should be noted that the lanyard 28 may have any known length and width and may also be adjustable, such that the length of the lanyard 28 may be shortened or lengthened once it is attached between the pickup truck bed 24 and the side edge of the base 32 of the roller tray 20. It should be noted that any other material other than fabric may be used for the lanyard 28 such as but not limited to any known plastic, ceramic, metal, composite or natural material. The truck 22 may allow for the removable roller tray 20 to be moved between a fully stored or inserted position within the truck bed 24 wherein the tailgate 26 may be closed and a fully extended position wherein the lanyard 28 is fully extended and taut between the side edge of the base 32 and the pickup truck bed side wall. The lanyard 28 also may allow for easy removal of the roller tray 20 by disconnecting the lanyard 28 from the side wall of the pickup truck bed 24 and then rolling the removable roller tray 20 directly out of the pickup truck bed 24. It should be noted that it is also contemplated to use more than two lanyards 28 and to use only one lanyard 28. Any number of lanyards 28, i.e., up to six in one embodiment, may be used with the present invention. However, it is noted that even more than six may be used depending on the design requirements of the roller tray 20. The lanyard 28 may also be attached to any surface of the base 32.

The roller tray 20 may also include and use a plurality of dividers or divider walls 30 thereon. Generally, the dividers 30 have a rectangular shape and a predetermined length, width and thickness. It should be noted that any known length, width and thickness may be used for the divider walls 30 as shown in the present invention. The dividers walls 30 generally are made of a plastic material, however it should be noted that any other known material, such as ceramic, composite, natural material, metal or any other known plastic may also be used for the dividers 30. It should also be noted that any other shape may be used for the dividers 30 other than rectangular as shown in the drawings, such as but not limited to square, round, triangular, random shapes, oblong, etc. Generally, the dividers 30 may or may not be used with the movable roller tray 20 according to the present invention. The use of the dividers 30 allows for a configurable storage unit for the pickup truck user. The dividers 30 generally are arranged within the notches 38, arranged along both the long edge and the short edge of the first and second bases 32 which form the roller tray 20. In one contemplated embodiment a total of eight dividers 30 may be used, such that three long dividers are arranged along the entire length of the roller tray 20 and five short dividers 30 are arranged along the width of the roller tray 20. It should be noted that dividers 30 may have a slot 58 arranged in and along one edge thereof, wherein the slot 58 may align with the other dividers 30 which also have a slot 58 thereon to allow for interconnection and interengagement between the dividers to ensure for a robust connection and fitting between the dividers 30. Thus, a slot 58 from one of the divider walls 30 may nest with and inter engage with a slot 58 from another divider 30, thus creating a secured connection therebetween. It is also contemplated to have divider walls 30 without slots 58 thereon, wherein just four divider walls 30 would be placed in the notches 38 of the base 32 to allow for outer walls to be formed on the outer surface of the roller tray 20. Therefore, any known pattern may be used to configure storage areas with the dividers 30 as described above. It is contemplated to use only one divider 30 within the system, two dividers, three dividers, four dividers, five dividers or any other number in any configuration to create a unique storage area with unique size storage compartments and areas for the roller tray 20 according to the present invention. It should be noted that any known size may be used for one contemplated embodiment and the dividers 30 shown are configurable for up to two, four or eight pockets, however any other number of pockets may also be used depending on the design requirements and environment in which the removable roller tray 20 may be used. It should be noted that the slot 58 on the dividers 30 may extend a predetermined distance into the edge of the divider 30. It should be noted that any known size may be used for the dividers 30, from one half inch up to twenty four inches depending on the environment and design of the pick up truck bed trolley system. Therefore, in operation, the light weight removable roller tray 20 may be removable and may only be attached with the lanyards 28 to the pickup truck 22. This attachment with the lanyards 28 may make for easy installation and quick removal of the removable roller tray 20 from the pickup truck 22 by a single user. Furthermore, the roller tray 20 may be removed, folded and stowed in a small area within a garage or other storage area by folding the roller tray 20 in half, thus creating an easier to store roller tray 20 than those of the prior art. The removable roller tray 20 of the present invention is easier to manufacturer, install and is lower in price than any of the prior art heavy duty pickup bed storage systems. Furthermore, the use of the roller tray 20 may allow for the entire truck bed to be usable by a single user of the pick up truck and may allow for a configurable system that may have dividers 30 to allow for predetermined sized pockets to be placed within a top surface of the roller tray 20 and may allow for items arranged within the truck bed not to move around during driving of the pickup truck 22. The pickup truck bed 24 may be completely accessible to the urban user of the pickup truck 22 with the use of the roller tray 20 according to the present invention.

The present description is for illustrative purposes only and it should not be construed to limit the present invention in any way. Thus, a person skilled in the art will appreciate that various modifications might be made to the present and disclosed embodiments without departing from the scope and spirit of the present invention, which is defined in terms of the claims below. Other aspects, features, and advantages may be apparent upon an examination of the attached drawing figures and appended claims.

What is claimed is:

1. A removable roller tray for use in a pickup truck, said tray comprising:
   a base having a longitudinal axis and comprising a first base and second base;
   a handle arranged on an edge of at least one of said first base or said second base;
   a plurality of rollers arranged on a bottom surface of said first base and said second base and in direct contact with a bed of the pickup truck; and
   at least one lanyard connected to a side edge of at least one of said first base or said second base on a first end and a sidewall surface of the bed of the pickup truck on a second end thereof;
   a plurality of channels molded into the first and second base, the channels running parallel to a longitudinal edge and a short edge of the first and second base and defining a plurality of raised surfaces arranged along an outer periphery lip of the first base and second base;
   at least two hinges arranged substantially parallel to the longitudinal edge connected to said first base and said second base arranged at the outer periphery lip of the first base and the second base and adjacent one or more of the raised surfaces.

2. The tray of claim 1 wherein said first base and second base are made of a high density polyester plastic.

3. The tray of claim 1 further comprising a plurality of dividers.

4. The tray of claim 3 wherein said one of said plurality of dividers is removably secured within one or more notches, said plurality of dividers create configurable storage areas on the removable roller tray.

5. The tray of claim 3 wherein said plurality of dividers having a slot arranged on one edge thereof.

6. The tray of claim 1 wherein said first base and said second base are movable with respect to the bed of the pickup truck.

7. The tray of claim 1 wherein said first base pivots with respect to said second base via said hinge, said hinge allows the removable roller tray to be folded in half for storage.

8. The tray of claim 1 wherein said plurality of rollers are casters.

9. The tray of claim 8 wherein said plurality of rollers are arranged along a long edge of said first base and said second base.

10. The tray of claim 1 wherein at least one of said first base or said second base has an attachment orifice arranged on a long edge of at least one of said first base or said second base.

11. The tray of claim 10 wherein said first end of said lanyard is secured to said attachment orifice.

12. The tray of claim 1 wherein said lanyard having an adjustable length, said lanyard defines a distance of travel of the removable roller tray between a fully inserted position and a fully extended position on the bed of the pickup truck.

13. The tray of claim 1 further comprising a second lanyard, said second lanyard connected to a second side edge of at least one of said first base or said second base, said first and second lanyard are removably connected to the pickup truck and define an only attachment between the removable roller tray and the pickup truck, said first lanyard is secured to a D-ring on said second end thereof.

14. The tray of claim 1 wherein said plurality of rollers are arranged in a staggered pattern on said bottom surface of said first base and said second base.

15. A method of installing the removable roller tray of claim 1 comprising the steps of:
   placing one or more of the plurality of rollers in direct contact with the bed of the pickup truck;
   rolling the removable roller tray into the bed of the pickup truck so that the tray is located entirely within the confines of the bed;
   securing a first end of the lanyard to the side edge of the removable roller tray; and
   securing a second end of said lanyard to a surface of the bed of the pickup truck
   removing the lanyard and rolling the removable roller tray out of the bed of the pickup truck
   folding the removable roller tray along the hinges to store the tray, wherein the tray is adapted to be folded in half.

16. The method of claim 15 further comprising the step of securing a second lanyard to another side edge of the removable roller tray and another surface of the bed of the pickup truck.

17. The tray of claim 1 wherein each of the first base and second base includes at least two rows of rollers.

18. The tray of claim 1, including more than two hinges.

19. The tray of claim 1, wherein the two or more hinges are substantially surrounded by at least one of the plurality of molded channels.

20. The tray of claim 1, wherein the tray includes a plurality of pockets.

* * * * *